United States Patent
Knox et al.

(10) Patent No.: US 7,125,029 B2
(45) Date of Patent: Oct. 24, 2006

(54) WHEEL ASSEMBLY

(76) Inventors: Johnny Michael Knox, 206 Lorraine Street, Weyburn, Saskatchewan (CA) S4H 1S1; Ronald Joseph Knox, 215 Government Road, Weyburn, Saskatchewan (CA) S4H 0P3; David Donald Honig, Box 512, Weyburn, Saskatchewan (CA) S4H 2K3

( * ) Notice: Subject to any disclaimer, the term of this patent is extended or adjusted under 35 U.S.C. 154(b) by 5 days.

(21) Appl. No.: 10/896,879

(22) Filed: Jul. 23, 2004

(65) Prior Publication Data

US 2005/0173880 A1    Aug. 11, 2005

(30) Foreign Application Priority Data

Jan. 26, 2004    (CA)    ................................. 2455907

(51) Int. Cl.
  *B62M 1/00*    (2006.01)
(52) U.S. Cl. ........................ 280/229; 280/221
(58) Field of Classification Search ............... 280/220, 280/221, 229
  See application file for complete search history.

(56) References Cited

U.S. PATENT DOCUMENTS

| | | | | |
|---|---|---|---|---|
| 1,679,819 A * | 8/1928 | Fageol | ........................ | 280/229 |
| 2,125,568 A * | 8/1938 | Huyssen et al. | ............ | 280/229 |
| 3,336,046 A * | 8/1967 | Seiling | ........................ | 280/229 |
| 3,371,944 A * | 3/1968 | Daniels | ........................ | 280/229 |
| 3,647,241 A * | 3/1972 | Huyssen | ........................ | 280/221 |
| 3,717,361 A * | 2/1973 | Vanderpool | ................... | 280/229 |
| 3,799,581 A * | 3/1974 | Munn | ........................... | 280/229 |
| 3,817,120 A * | 6/1974 | Clay | .............................. | 301/1 |
| 3,831,977 A * | 8/1974 | Osborne et al. | ............. | 280/229 |
| 4,588,232 A | 5/1986 | Kim et al. | | |
| 4,755,005 A | 7/1988 | Tsai | | |
| 6,186,918 B1 | 2/2001 | Yoo | | |
| 6,374,975 B1 * | 4/2002 | Schlanger | ..................... | 192/64 |
| 6,609,721 B1 * | 8/2003 | Clift, Jr. | ....................... | 280/210 |
| 2002/0167150 A1 * | 11/2002 | Clift, Jr. | ....................... | 280/252 |

* cited by examiner

*Primary Examiner*—Lesley D. Morris
*Assistant Examiner*—Daniel Yeagley
(74) *Attorney, Agent, or Firm*—Ryan W. Dupuis; Michael R. Williams; Adrian D. Battison

(57) ABSTRACT

A wheel assembly is provided, particularly for use with a vehicle, for example a scooter or a bicycle and the like, for operation in both eccentric and concentric modes. The wheel rim of the assembly rotatably and concentrically supports a wheel hub thereon. An offset axle is supported on the wheel hub radially spaced from the central axis of the wheel for rotation with the wheel hub relative to the wheel rim about the central axis. The offset axle rotatably connects to the frame of the vehicle. A locking mechanism selectively engages the wheel hub for rotation with the wheel rim in the eccentric mode, while the rim rotates freely about the central axis relative to the rim in the concentric mode. In this arrangement, any variety of simple clutch mechanism between the hub and the rim is effective for converting between the eccentric and concentric modes of operation.

20 Claims, 9 Drawing Sheets

WHEEL ASSEMBLY

FIELD OF THE INVENTION

The present invention relates to wheel assembly for use in concentric and eccentric modes of operation which is particularly suited for bicycles and scooters and the like.

BACKGROUND

Bicycles and scooters are common types of personal vehicles generally including a frame for carrying a person thereon and which is supported for rolling movement along the ground on a pair of wheels. Bicycles are typically manually propelled with a pedal and chain system whereas scooters typically provide a flat deck upon which the person stands for manually propelling the vehicle by pushing off the ground with one foot. In some instances however it is known to provide one wheel of the scooter supported for eccentric rotation whereby a jumping motion on the deck which is timed to match the oscillations of rotation of the eccentric wheel can give forward motion to the scooter. Known designs however do not readily permit conversion between concentric and eccentric rotation while in motion.

U.S. Pat. No. 3,371,944 to Daniels, U.S. Pat. No. 4,588,232 to Kim et al, U.S. Pat. No. 4,755,005 to Tsai, U.S. Pat. No. 6,186,918 to Yoo, U.S. Pat. No. 6,609,721 to Clift Jr. and U.S. Pat. No. 3,717,361 to Vanderpool disclose various examples of wheel assemblies which can be converted between eccentric and concentric modes of operation. In each instance however a single axle is provided which requires a complex arrangement of parts for actually moving the axle between the concentric mode in which the axle is concentric with the surrounding wheel and an eccentric mode in which the axle is radially offset from the centre of the wheel. In most examples the complex arrangement does not permit conversion while in motion whereas in other instances the complex configuration of the parts would likely be susceptible to jamming and would be difficult to maintain.

SUMMARY

According to one aspect of the present invention there is provided a wheel assembly for supporting a frame thereon for rolling movement along the ground, the wheel assembly comprising:

a wheel rim for carrying a tire thereon;

a wheel hub supported concentrically on the wheel rim for rotation relative to the wheel rim about a central axis of the wheel rim;

an offset axle supported on the wheel hub radially spaced from the central axis for rotation with the wheel hub relative to the wheel rim about the central axis;

a frame mount for coupling to the frame, the frame mount being rotatably coupled to the offset axle for relative rotation therebetween about an eccentric axis of the offset axle lying parallel to and spaced from the central axis; and a locking mechanism movable between a concentric mode in which the wheel hub is rotatable relative to the wheel rim about the central axis and an eccentric mode in which the wheel hub and the wheel rim are locked together for rotation together about the eccentric axis.

By providing a wheel hub concentric with the wheel and an offset axle rotatably coupled to the frame supported on the wheel, the wheel can readily be converted from rotation about the central axis to rotation about the eccentric axis with a simple clutch or locking mechanism between the wheel hub and wheel rim. By simply shifting from one axis to another as opposed to relocating the axle, a much simpler and much more reliable mechanism can be achieved which is effective at providing a wheel convertible between concentric and eccentric modes of operation while in motion using a simple clutch, cable mechanism or other remote actuating means.

The frame mount is preferably rotatable relative to the offset axle in both the concentric and eccentric modes of the locking mechanism.

The wheel rim may include a central axle rotatable together with the wheel rim and rotatably supporting the wheel hub thereon. The offset axle is preferably formed integrally with the wheel hub for rotation about the central axle as well.

The locking mechanism may include a first mating portion rotatable with the wheel rim and a second mating portion rotatable with the wheel hub in which the first and second mating portions are movable relative to one another in an axial direction of the wheel rim between the concentric and eccentric modes of the locking mechanism.

In one embodiment, the first and second mating portions comprise confronting flat surfaces engaged with one another in the eccentric mode of the locking mechanism in which at least one of the flat surfaces having high friction material thereon.

Alternatively, the first and second mating portions may comprise respective toothed surfaces engaged with one another in the eccentric mode of the locking mechanism. In this instance, the toothed surfaces may each have teeth with mating faces oriented substantially parallel to the central axis.

Preferably the locking mechanism is biased towards the eccentric mode by a spring supported against a threaded adjustment member for adjusting compression force of the spring.

When there is provided an actuator for controlling movement of the locking mechanism between the concentric and eccentric modes, the actuator is preferably supported on the wheel rim for rotation relative to the wheel rim and the wheel hub. The actuator may be cable operated in this instance.

When the actuator is supported on the wheel rim opposite the wheel hub and the offset axle, the actuator may be coupled to the hub for displacing the hub in an axial direction between the concentric and eccentric modes by an actuator pin slidably received concentrically through a central axle of the wheel rim.

The wheel assembly may be provided in combination with a scooter including a deck for supporting a person thereon, handle bars extending upwardly from a front end of the deck, a rear wheel at a rear end of the deck and a front wheel at the front end of the deck, in which at least one of the wheels includes the wheel assembly supporting the wheel on the deck. Preferably only the rear wheel includes the wheel assembly and the lock mechanism is actuated by a lever on the handle bars connected to the lock mechanism by a cable.

According to a second aspect of the present invention there is provided a wheel assembly for supporting a frame thereon for rolling movement along the ground, the wheel assembly comprising:

a wheel rim for carrying a tire thereon, the wheel rim including a track formed thereon which extends in a radial direction;

an axle supported on the wheel rim for sliding movement along the track between a concentric mode in which the axle is concentric with a central axis of the wheel rim and an eccentric mode in which the axle is parallel to and radially spaced from the central axis for rotation with the wheel rim about the central axis;

a frame mount for coupling to the frame, the frame mount being rotatably coupled to the axle for relative rotation therebetween an eccentric axis of the axle; and a locking mechanism for selectively restricting sliding movement of the axle along the track, the locking mechanism including a quick release lever which selectively engages the locking mechanism.

The wheel assembly according to the second aspect of the present invention may be provided in combination with a scooter including a deck for supporting a person thereon, handle bars extending upwardly from a front end of the deck, a rear wheel at a rear end of the deck and a front wheel at the front end of the deck, in which at least one of the wheels includes the wheel assembly incorporated therein which connects that wheel to the deck of the scooter.

BRIEF DESCRIPTION OF THE DRAWINGS

In the accompanying drawings, which illustrate an exemplary embodiment of the present invention.

DETAILED DESCRIPTION

Figure 1:
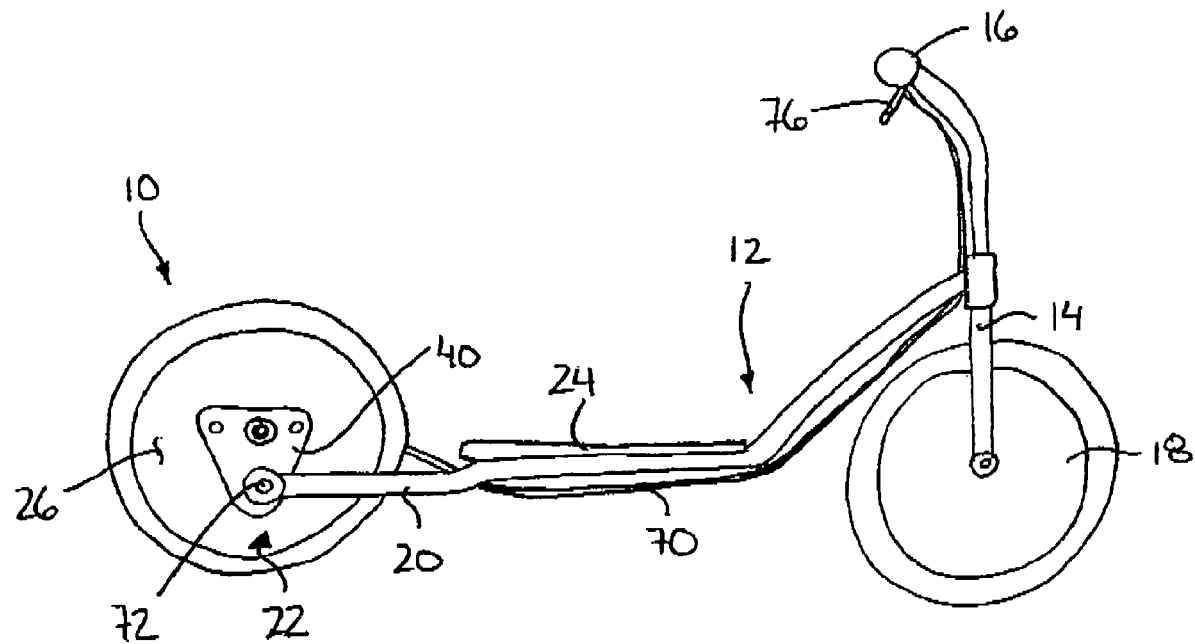
FIG. 1 is a schematic view of a scooter upon which a first embodiment of the wheel assembly is mounted.
Figure 5:
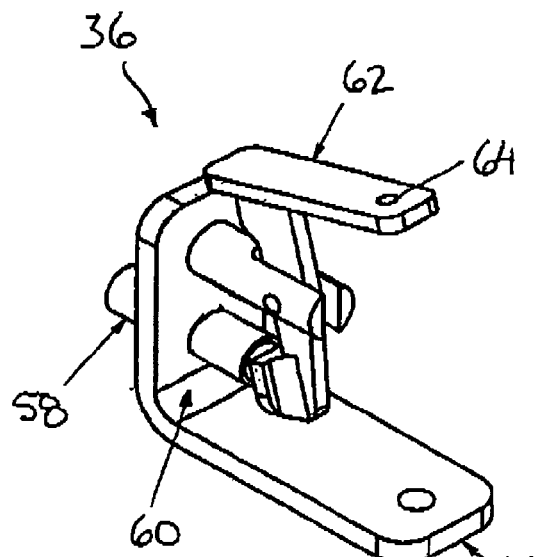
FIG. 5 is a perspective view of the actuator mechanism.
Figure 2:
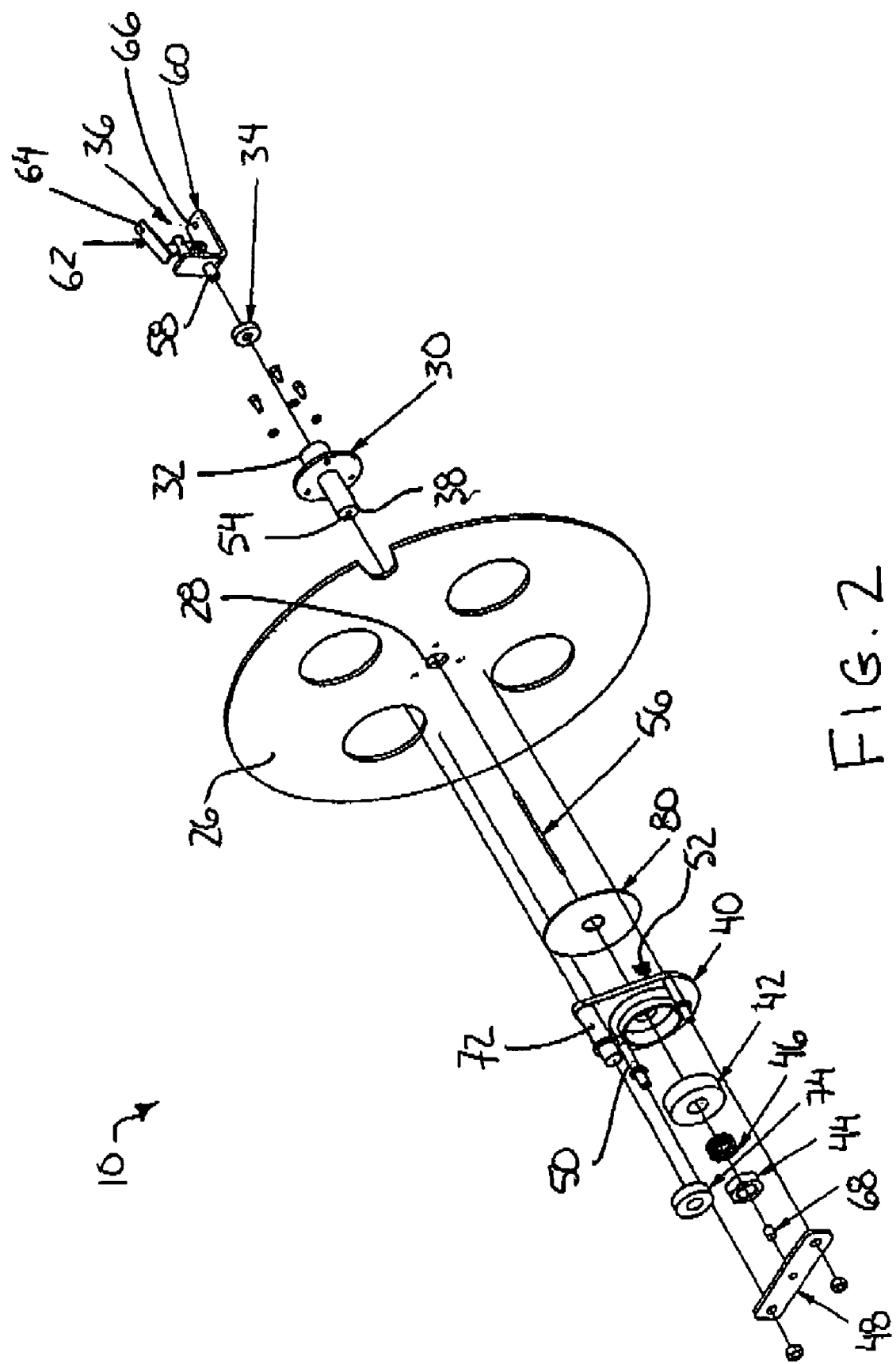
FIG. 2 is an exploded perspective view of the wheel assembly according to the first embodiment.
Figure 3:
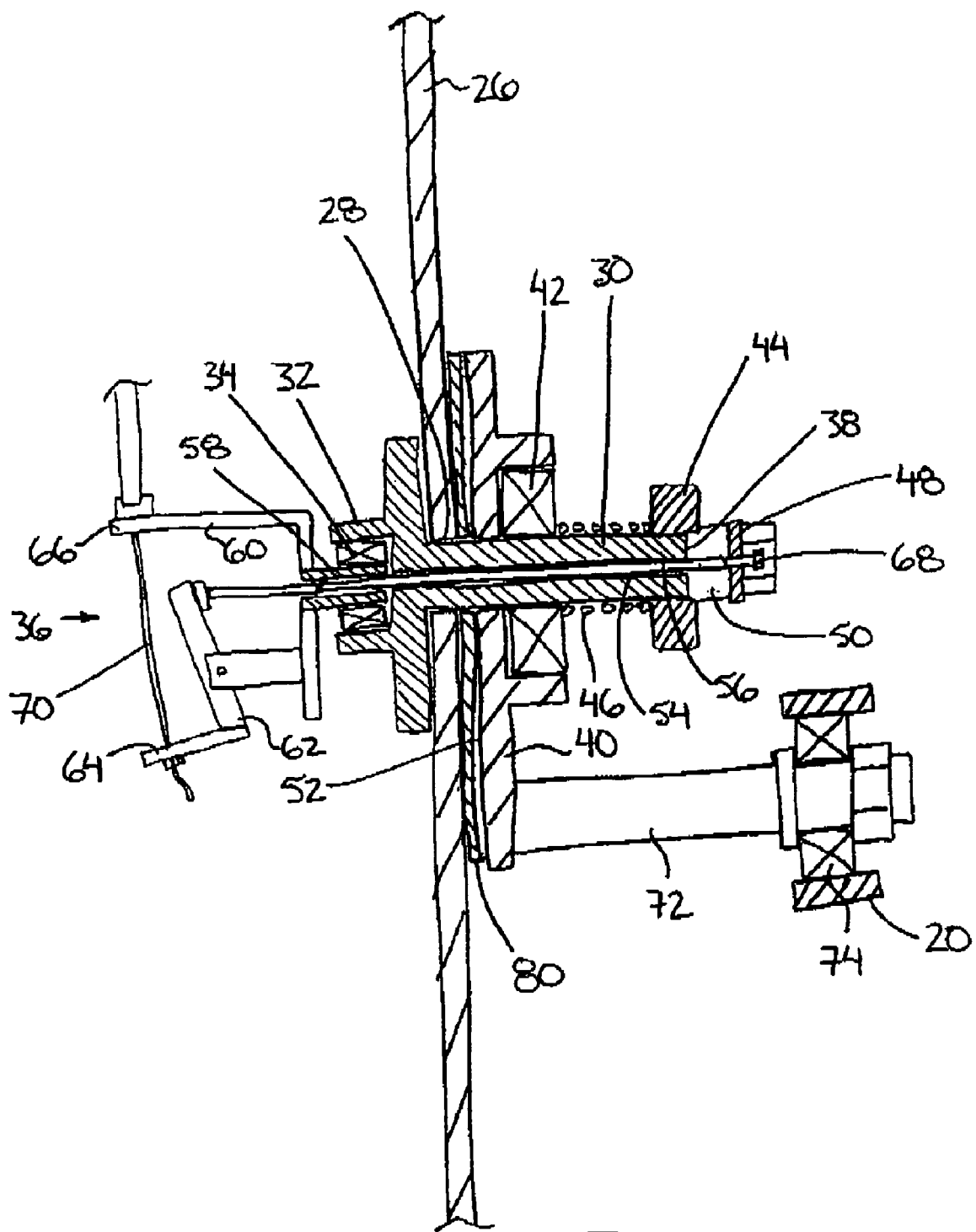
FIGS. 3 and 4 are sectional views along the line 3—3 of FIG. 1 in respective eccentric and concentric modes of operation.
Figure 4:
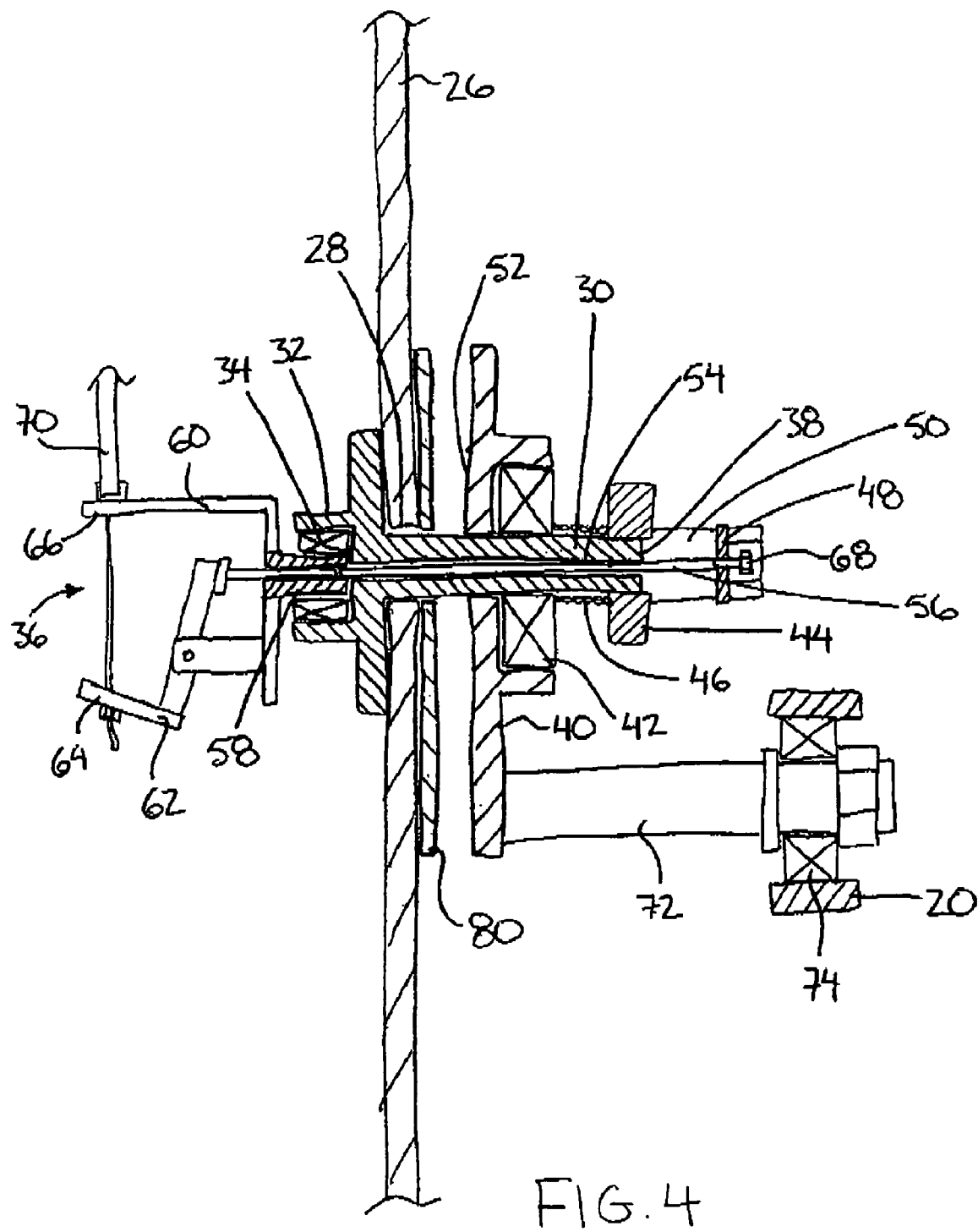

Referring to the accompanying drawings, there is illustrated a wheel assembly generally indicated by reference numeral 10. The wheel assembly 10 is particularly suited for use with a scooter 12 for operation in either eccentric or concentric modes.

The scooter 12 includes a frame having a steering fork 14 at a front end which is operatively connected to handle bars 16 to control steering of a front wheel 18 of the scooter. The frame further includes a rear fork arm 20 extending to a rear end of the frame for supporting a rear wheel 22 thereon. A deck 24 is provided for supporting a person thereon which spans between the front and rear ends of the frame between the front and rear wheels. The front wheel 18 includes a rim having a central axle about which the wheel rotates. The rim carries a tire thereon. The rear wheel also includes a rim 26 for supporting a tire thereon. The rim 26 of the rear wheel incorporates the wheel assembly 10 according to the present invention therein.

While various embodiments of the wheel assembly are illustrated in the accompanying Figures, the common elements of the first and second embodiments will first be described herein. The rim 26 includes a central bore 28 formed therein which is concentric with an outer periphery of the rim carrying the tire thereon. A hub axle 30 is supported concentrically within the bore 28 and is secured to the rim with suitable fasteners such that the axle 30 rotates with the rim.

The hub axle 30 includes a collar 32 formed at an outer side thereof which receives a bearing 34 therein which rotatably supports an actuator 36 within the bearing for rotation relative to the rim and hub axle. The hub axle extends inwardly to a free end 38 and rotatably supports a wheel hub 40 thereon concentric with the rim for relative rotation therebetween about a centre axis of the wheel. The hub is carried on a bearing 42 supported between the hub axle 30 and the wheel hub 40. The bearing 42 permits free rotation between the wheel hub and the hub axle, while also permitting some sliding movement of the hub along the hub axle in an axial direction between the collar 32 at the outer side and the free end 38.

The free end 38 of the hub axle is externally threaded for threadably receiving a nut 44 thereon. The nut provides a backing for a spring 48 concentrically mounted about the hub axle between the nut 44 at the free end 38 thereof and the bearing 42 of the wheel hub 40. The spring 46 is mounted under compression to urge the hub into mating engagement with the rim which mounts on the hub axle adjacent the collar 32 at the outer side thereof. When the wheel hub 40 is urged into mating engagement with the rim, the rim and wheel hub are locked together for rotation as a common element. Compression force of the spring 46 is adjusted by adjusting the axial position of the nuts along the hub axle by rotating the nut in relation to the threads on the axle.

The wheel hub has an end plate 48 which is spaced axially beyond the free end 38 of the hub axle. A support 50 spans between an inner end 52 of the wheel hub at the bearings 42 supported on the hub axle to the end plate 48 for supporting the end plate.

A through bore 54 is formed through the hub axle from the actuator 36 through to the free end 38 for slidably receiving an actuator pin 56 therethrough. The actuator pin is in abutment between the actuator 36 and the end plate 48 of the hub such that the actuator controls axial position of the actuator pin which in turn abuts the end plate 48 for axially displacing the wheel hub slidably along the hub axle against the compression force 46 of the spring.

The actuator 36 includes a sleeve 58 rotatably received within the bearing 34 at the outer side of the hub axle. An L-shaped bracket 60 is fixed in relation to the sleeve 58 and includes a bore in alignment with the sleeve to permit the actuator pin 56 to be slidably received therethrough. A lever 62 is pivotally coupled to the bracket 60 for engagement in an abutting relationship with the free end of the actuator pin at an inner end of the lever. A free end 64 of the lever is spaced from a free end 66 of the bracket with the lever being oriented such that movement of the free ends 64 and 66 towards one another causes the inner end of the lever to engage the actuator pin for forcing the actuator pin to be slidably displaced inwardly against the end plate 48 of the hub at the opposing end of the pin. Continued inward movement of the actuator pin at the actuator 36 causes the end plate of the hub to be displaced away from the rim such that the inner end 52 of the hub which is coupled to the end plate 48 by the support 50 is also displaced away from the rim, thereby compressing the spring 46 in compression between the inner end 52 of the hub and the nut 44 at the free end of the hub axle.

The inner end 52 of the hub defines a first mating surface for engagement with a confronting second mating surface of the rim. The first and second mating faces are thus axially slidable relative to one another along the centre axis of the wheel.

The actuator pin 56 abuts the end plate 48 at a bore in the plate fitted with an adjustable screw 68 threadably received therein. Axial position of the screw 68 can be threadably adjusted for controlling the amount of displacement of the wheel hub along the hub axle in response to sliding of the actuator pin through the bore in the hub axle. A conventional cable mechanism 70 couples between the free ends 64 and 66 of the actuator which is also adjustable in nature to further permit some adjustment of the axial displacement of the wheel hub along the hub axle.

An offset axle 72 is carried on the wheel hub 40 for rotation therewith about the central axis of the wheel. The offset axle 72 is mounted at a fixed radial spacing from the centrally located hub axle 30. The offset axle extends axially beyond the free end of the hub axle for mounting the free end of the rear fork arm 20 thereon using a suitable bearing 74 which permits the axle 72 to be freely rotatable in relation to the frame of the scooter about an eccentric axis extending longitudinally through the offset axle 72 parallel and spaced from a central axis extending longitudinally through the hub axle.

In normal eccentric operation, the spring 46 urges the first and second mating faces of the wheel hub and rim respectively into mating engagement with one another whereby the wheel hub and rim are locked for rotation together. The offset axle 72 remains rotatable relative to the scooter and accordingly the wheel is supported for eccentric rotation about the eccentric axis of the offset axle 72 in relation to the frame of the scooter.

A hand operated lever 76 is provided on the handle bars of the scooter for connection to the free ends of the actuator by the cable mechanism 70 in which the cable mechanism 70 comprises a cable slidable relative to a surrounding sheath in which the sheath is anchored to one of the free ends and the cable is anchored to the other to cause relative displacement between the free ends of the actuator by sliding the cable within the sheath. Such sliding movement of the cable relative to the sheath is controlled by the lever 76 on the handlebars so that the sliding actuator pin 56 is in turn displaced axially within the hub axle to urge the wheel hub outwardly away from the rim against the compressive force of the spring 46 into the concentric mode.

The first and second mating surfaces are separated in the concentric mode so that the wheel hub is again freely rotatable relative to the rim about the central hub axle concentric with the rim. Weight of the rider on the frame of the scooter causes the offset axle 72, which is freely rotatable with the wheel hub about the hub axle, to drop to a lowermost position as illustrated in FIG. 1 in a coasting mode in which the rear wheel is arranged for concentric rotation about the central hub axle while the bearing 74 at the offset axle remains freely rotatable.

Turning now to the first embodiment, reference is made to FIGS. 1 through 4 in which the first embodiment is illustrated in further detail. In the first embodiment the wheel hub 40 comprises a flat plate defining the first mating surface at the inner side 52 thereof which confronts a flat surface of the rim which also comprises a flat plate. A flat disc 80 of friction material is adhered to the second mating surface of the rim which confronts the inner end of the hub so that when the wheel hub and rim are displaced into mating engagement with one another, the flat disc of high friction material is gripped therebetween to force rotation of the wheel hub and rim together.

The offset axle 72 is carried on the plate defining the wheel hub to project axially therefrom away from the rim beyond the free end of the hub axle and beyond the end plate 48 of the hub. The support 50 in this instance comprises two posts which are spaced apart from the hub axle on diametrically opposed sides thereof. The end plate 48 spans the free ends of the posts and mounts the adjustment screw 68 centrally therein between the posts.

Figure 6:
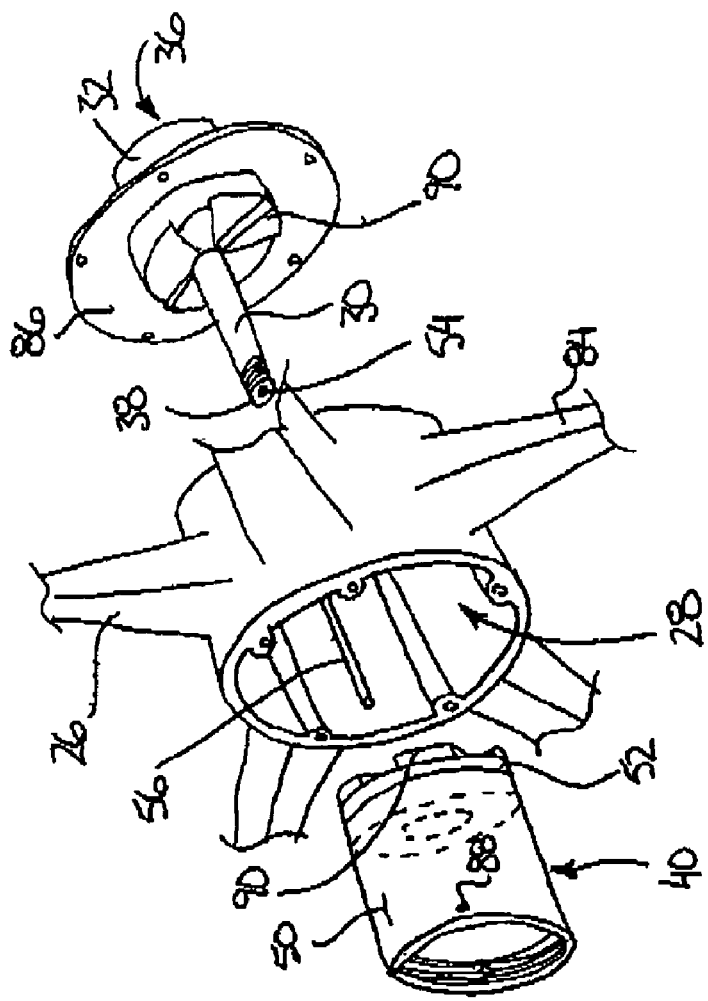
FIG. 6 is an exploded perspective view of a second embodiment of the wheel assembly.
Figure 6:
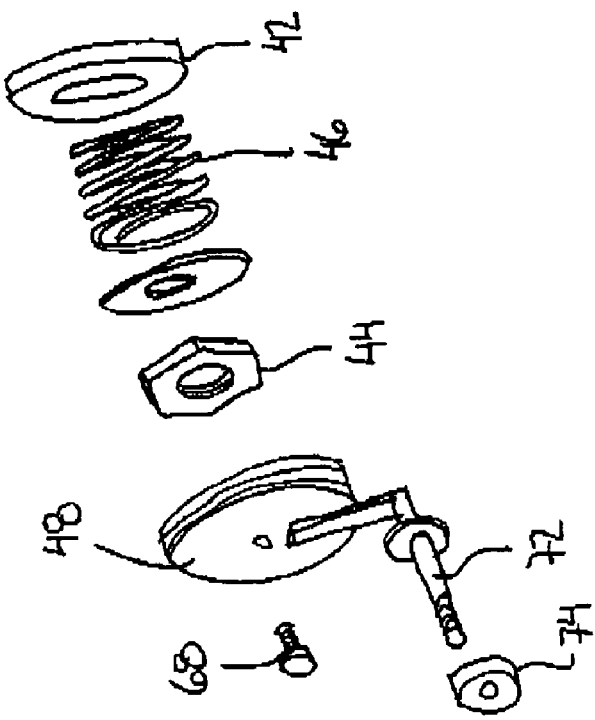
Figure 7:
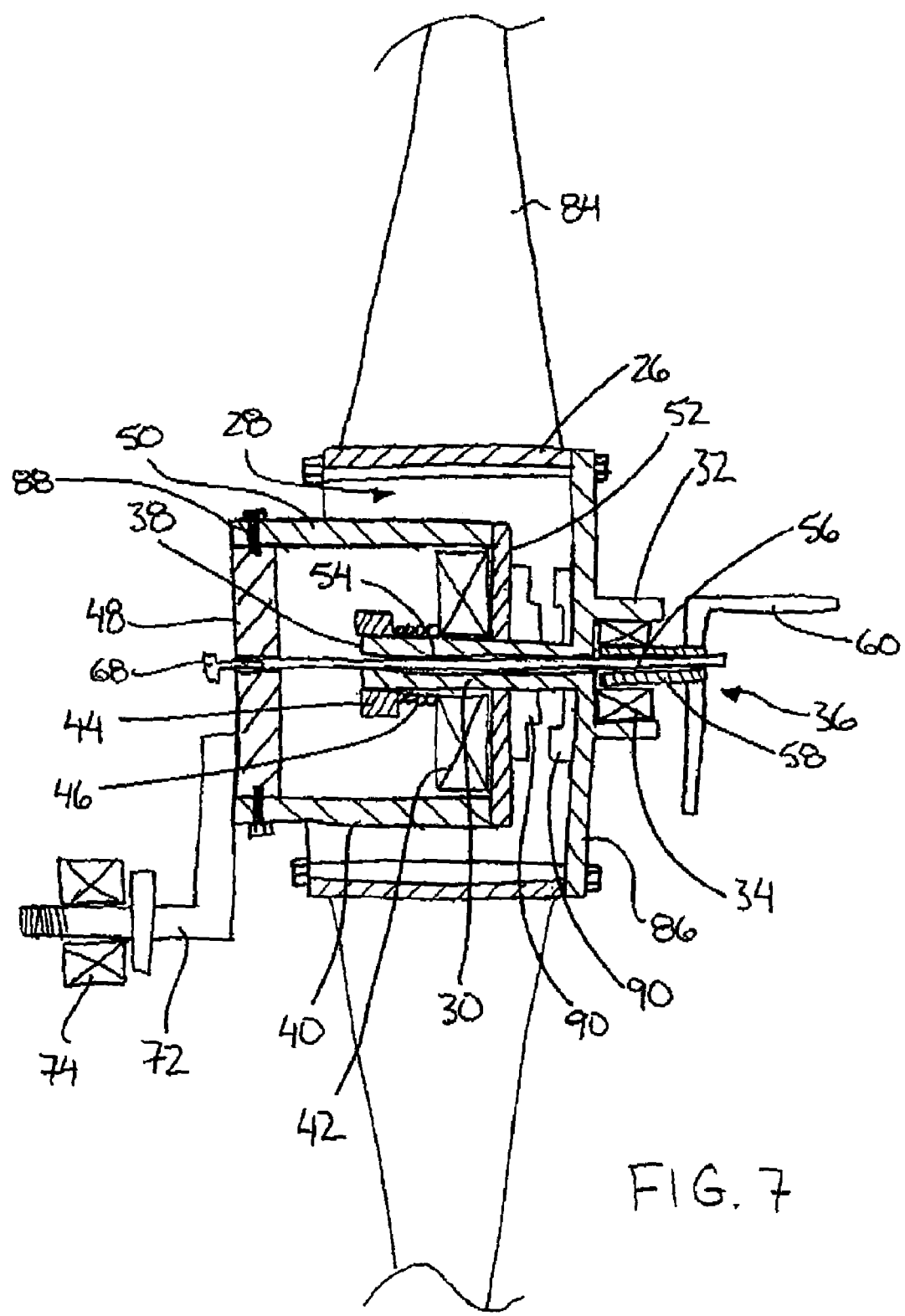
FIGS. 7 and 8 are sectional views of the wheel assembly according to the second embodiment in respective eccentric and concentric modes of operation.
Figure 8:
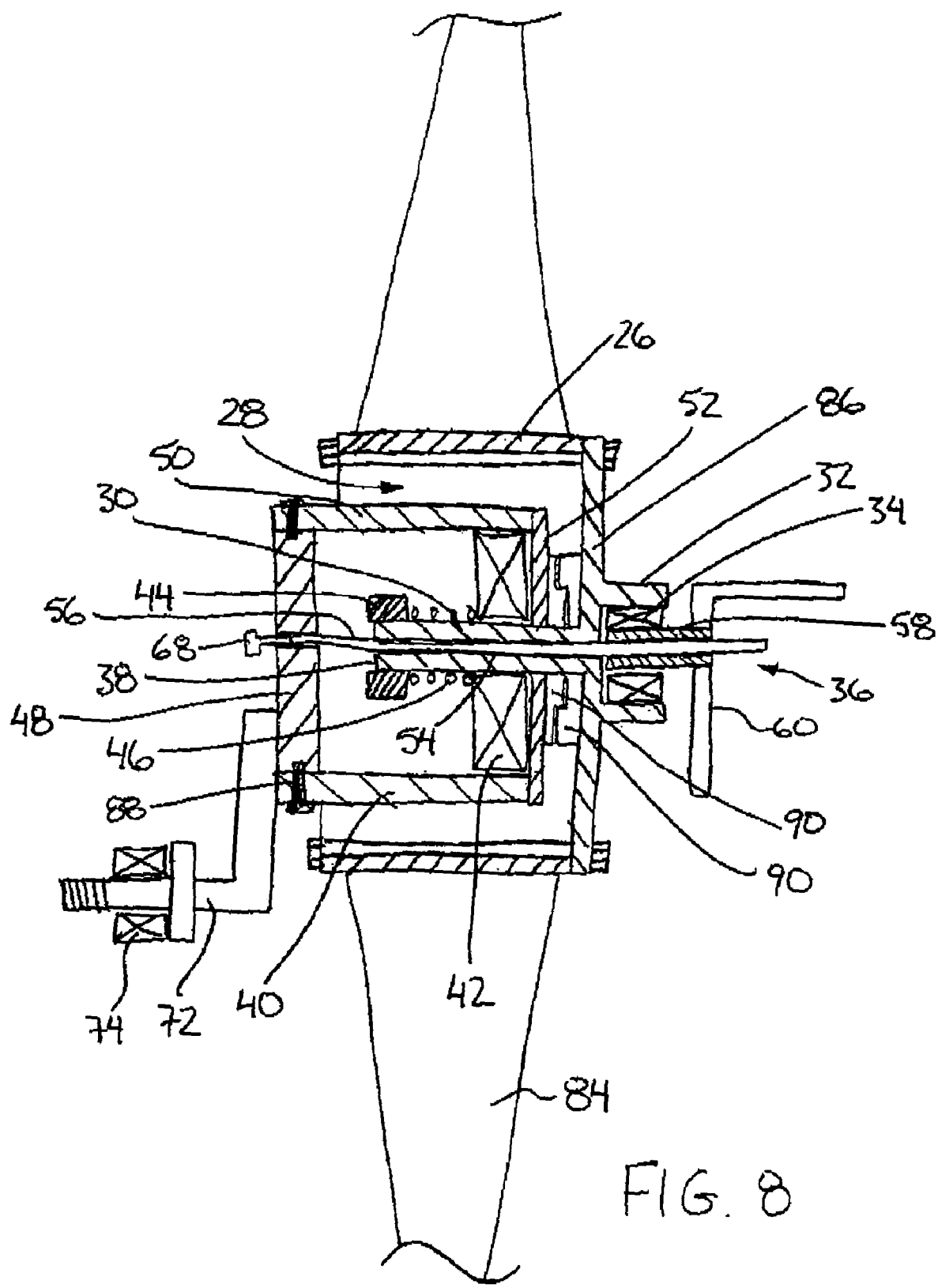

Turning now to FIGS. 6 through 8, the second embodiment will now be described in further detail. The rim in this instance includes a large diameter collar which defines the bore 28 of the rim as the opening extending through the collar. Spokes 84 span between the collar and the periphery of the rim which supports the tire thereon. The hub axle includes an integral end plate 86 which supports the collar 32 on the outer side thereof which rotatably supports the actuator 36 therein. The inner surface of the end plate 86 defines the second mating surface thereon concentrically about the hub axle projecting inwardly to the free end 38 of the axle.

The hub in this instance comprises a cylindrical pipe having an end wall at the inner end 52 which defines the first mating surface. The support 50 of the hub comprises the cylindrical walls of the pipe which extend from the inner end 52 to the end plate 48 spaced axially therefrom. The end plate 48 spans the interior diameter of the pipe and is held in place by suitable set screws 88.

The first and second mating surfaces of the hub and rim respectively each include teeth 90 having substantially square perpendicular faces lying parallel to the central axis for positive engagement with one another when the wheel hub and rim are engaged in the eccentric mode. The teeth 90 are suitably sized for a close fit engagement with the teeth of the opposing mating face. The perpendicular faces of the teeth require minimal spring force to remain in engagement with one another and accordingly a minimal depth in the order of one eight of an inch is suitable for engagement. Axial displacement of the wheel hub along the hub axle relative to the rim between the concentric and eccentric modes is thus only required to be in the order of one eight of an inch to effectively engage and disengage the wheel hub from rotation with the rim. In the second embodiment, the offset axle 72 is carried on the end plate 48 of the hub 40 for rotation with the hub.

In either the first or second embodiments, the use of an actuator 36 which is mounted in bearings permits actuation thereof by a remote cable mechanism while the scooter is in motion. A user of the scooter may then initially leave the lock mechanism in the form of the first and second mating surfaces in engagement with one another in the eccentric mode of rotation such that the wheel rotates about the eccentric axis of the offset axle 72. In this arrangement a jumping action on the deck which is timed to coincide with the oscillations of the rotation of the rear wheel permits the scooter to be propelled forwardly. When a desirable speed is reached, applying force to the lever 76 on the handlebars of the scooter releases the wheel hub from the rim to permit coasting free rotation about the central axis of the hub axle in a concentric mode of rotation.

Figure 9:
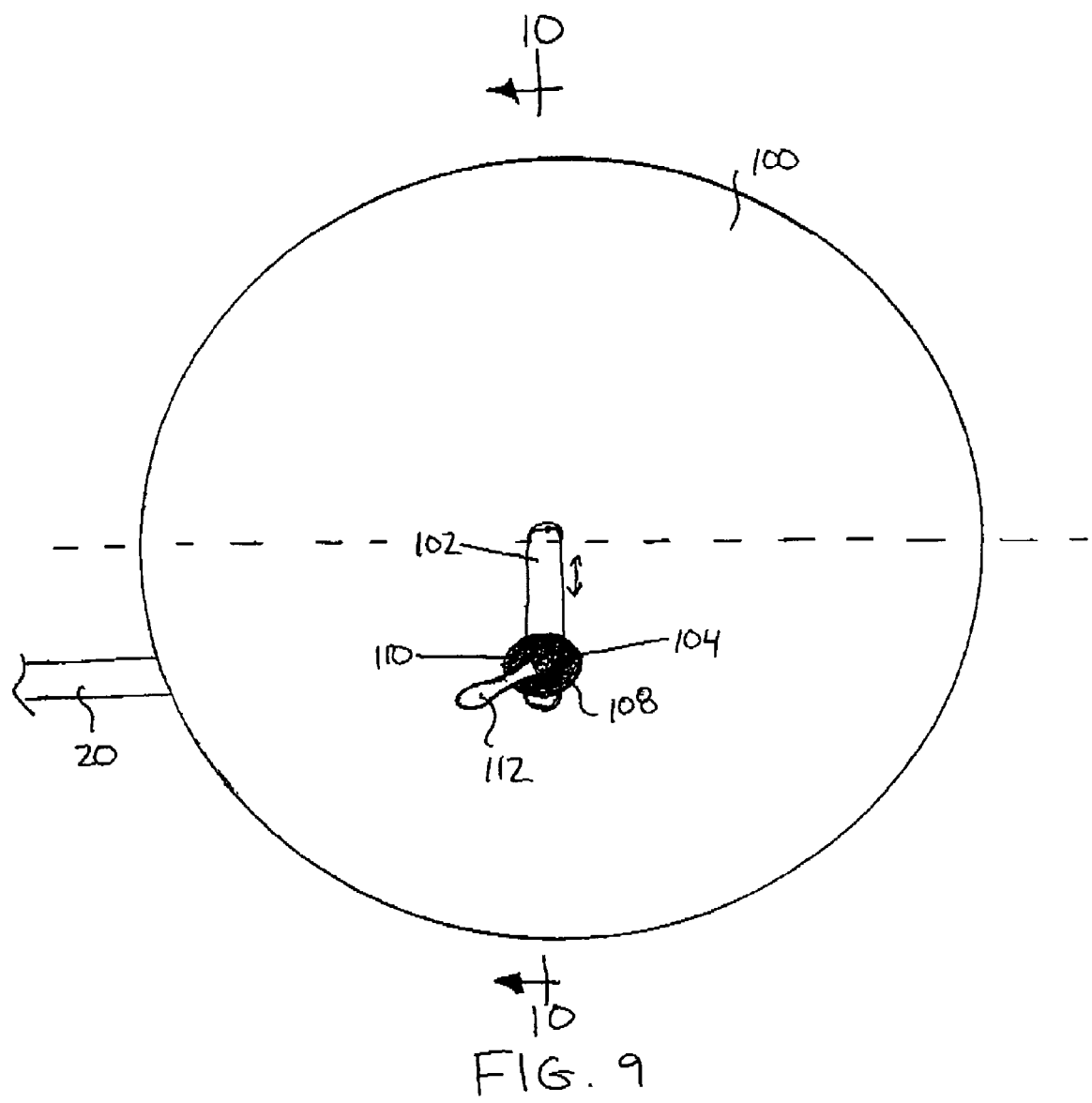
FIG. 9 is a side elevational view of a third embodiment of the wheel assembly.
Figure 10:
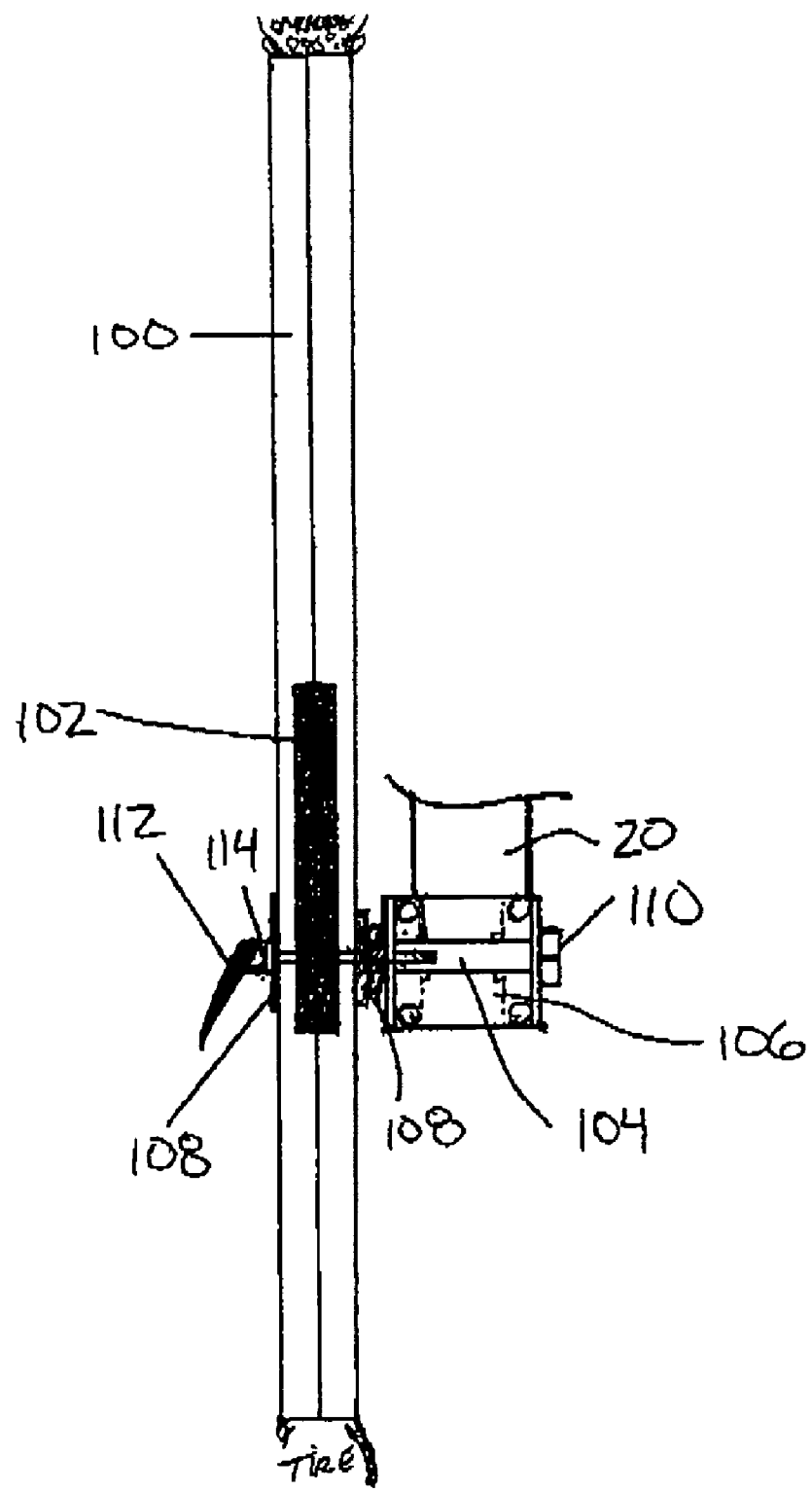
FIG. 10 is a sectional view along the line 10—10 of FIG. 9.

Turning now to the embodiment of FIGS. 9 and 10, a further wheel assembly is illustrated which can be operated in both concentric and eccentric modes. The wheel assembly includes a rim in the form of a flat disc 100 which includes a radially extending slot 102 formed therein which extends from a centre of the wheel to a terminal end radially offset from the centre of the wheel. The radial slot defines a track which slidably carries an axle 104 of the wheel therein. The axle 104 lies parallel to the central axis of rotation of the wheel rim 100. The axle 104 is thus slidable between a concentric position at the inner end of the slot to an eccentric position with varying degrees of eccentric rotation depending upon the distance from the centre of the wheel.

The axle 104 mounts a bearing 106 at the free end thereof for mounting to the frame of the scooter 12. The axle 104 is accordingly rotatable relative to the frame about an eccentric axis extending through the axle 104. When the axle is positioned at the inner end of the slot at a centre of the wheel, the eccentric axis of the axle 104 coincides with the concentric axis of the wheel.

The axle 104 includes a pair of confronting clamping surfaces 108 at an inner end thereof opposite the bearing 106 which is mounted to the frame. The confronting clamping surfaces 108 are supported on the axle on opposing sides of the rim 100 for clamping the rim therebetween in a locked position. The clamping surfaces have suitable friction for clamping securely onto opposing surfaces of the rim 100. Clamping action of the surfaces 108 is controlled by a cam bolt 110 secured through the axle. The cam bolt includes a lever arm 112 including a camming face 114 which increases in dimension at a point of engagement with the clamping surfaces 108 to urge an outermost one of the clamping surfaces 108 inward as the lever arm 112 is rotated. Accordingly the cam bolt can be pivoted into a clamped position at any one of various selected spacings from the centre of the wheel.

While one embodiment of the present invention has been described in the foregoing, it is to be understood that other embodiments are possible within the scope of the invention. For example, the square perpendicular faces of the teeth 90 may be at a slight mating incline, a few degrees offset from the axial direction of the wheel, for ease of engagement of the teeth meshing with one another in use. The invention is to be considered limited solely by the scope of the appended claims.

The invention claimed is:

1. A wheel assembly for supporting a frame thereon for rolling movement along the ground, the wheel assembly comprising:
    a wheel rim for carrying a tire thereon;
    a wheel hub supported concentrically on the wheel rim for rotation relative to the wheel rim about a central axis of the wheel rim;
    an offset axle supported on the wheel hub radially spaced from the central axis for rotation with the wheel hub relative to the wheel rim about the central axis;
    a frame mount for coupling to the frame, the frame mount being rotatably coupled to the offset axle for relative rotation therebetween about an eccentric axis of the offset axle lying parallel to and spaced from the central axis; and
    a locking mechanism movable between a concentric mode in which the wheel hub is rotatable relative to the wheel rim about the central axis and an eccentric mode in which the wheel hub and the wheel rim are locked together for rotation together about the eccentric axis; the locking mechanism including a first mating portion rotatable with the wheel rim and a second mating portion rotatable with the wheel hub, the first and second mating portions being movable relative to one another in an axial direction of the wheel rim between the concentric and eccentric modes of the locking mechanism.

2. The wheel assembly according to claim 1 wherein the frame mount is rotatable relative to the offset axle in both the concentric and eccentric modes of the locking mechanism.

3. The wheel assembly according to claim 1 wherein the wheel rim includes a central axle rotatable together with the wheel rim and rotatably supporting the wheel hub thereon.

4. The wheel assembly according to claim 1 wherein the locking mechanism is slidable in relation to the wheel rim in an axial direction of the wheel rim between the concentric and eccentric modes of the locking mechanism.

5. The wheel assembly according to claim 1 wherein the first and second mating portions comprise respective toothed surfaces engaged with one another in the eccentric mode of the locking mechanism.

6. The wheel assembly according to claim 1 wherein the toothed surfaces each have teeth with mating faces oriented substantially parallel to the central axis.

7. The wheel assembly according to claim 1 wherein the looking mechanism is biased towards the eccentric mode.

8. The wheel assembly according to claim 7 wherein the locking mechanism is biased towards the eccentric mode by a spring supported against a threaded adjustment member for adjusting compression force of the spring.

9. The wheel assembly according to claim 1 wherein the offset axle is fixed with respect to the wheel hub.

10. The wheel assembly according to claim 1 wherein there is provided an actuator for controlling movement of the locking mechanism between the concentric and eccentric modes, the actuator being supported on the wheel rim for rotation relative to the wheel rim and the wheel hub.

11. The wheel assembly according to claim 10 wherein the actuator is cable operated.

12. The wheel assembly according to claim 10 wherein the actuator is supported on the wheel rim opposite the wheel hub and the offset axle.

13. The wheel assembly according to claim 12 wherein the actuator is coupled to the hub for displacing the hub in an axial direction between the concentric and eccentric modes by an actuator pin slidably received concentrically through a central axle of the wheel rim.

14. The wheel assembly according to claim 1 in combination with a scooter including a deck for supporting a person thereon, handle bars extending upwardly from a front end of the deck, a rear wheel at a rear end of the deck and a front wheel at the front end of the deck, at least one of the wheels including the wheel assembly supporting the wheel on the deck.

15. The wheel assembly according to claim 14 wherein only the rear wheel includes the wheel assembly.

16. The wheel assembly according to claim 14 wherein the lock mechanism is actuated by a lever on the handle bars connected to the lock mechanism by a cable.

17. The wheel assembly according to claim 1 wherein the first and second mating portions comprise confronting flat surfaces engaged with one another in the eccentric mode of the locking mechanism, at least one of the flat surfaces having high friction material thereon.

18. A wheel assembly for supporting a frame thereon for rolling movement along the ground, the wheel assembly comprising:
    a wheel rim for carrying a tire thereon;
    a wheel hub supported concentrically on the wheel rim for rotation relative to the wheel rim about a central axis of the wheel rim;

an offset axle supported on the wheel hub radially spaced from the central axis for rotation with the wheel hub relative to the wheel rim about the central axis;

a frame mount for coupling to the frame, the frame mount being rotatably coupled to the offset axle for relative rotation therebetween about an eccentric axis of the offset axle lying parallel to and spaced from the central axis;

a locking mechanism movable between a concentric mode in which the wheel hub is rotatable relative to the wheel rim about the central axis and an eccentric mode in which the wheel hub and the wheel rim are locked together for rotation together about the eccentric axis; and an actuator for controlling movement of the locking mechanism between the concentric and eccentric modes, the actuator being supported on the wheel rim opposite the wheel hub and the offset axle for rotation relative to the wheel rim and the wheel hub.

19. The wheel assembly according to claim 18 wherein the actuator is coupled to the hub for displacing the hub in an axial direction between the concentric and eccentric modes by an actuator pin slidably received concentrically through a central axle of the wheel rim.

20. The wheel assembly according to claim 19 wherein the locking mechanism includes a first mating portion rotatable with the wheel rim and a second mating portion rotatable with the wheel hub, the first and second mating portions being movable relative to one another in an axial direction of the wheel rim between the concentric and eccentric modes of the locking mechanism.

* * * * *